(No Model.)
J. S. WHITNEY.
LUBRICATING DEVICE.
No. 443,265. Patented Dec. 23, 1890.
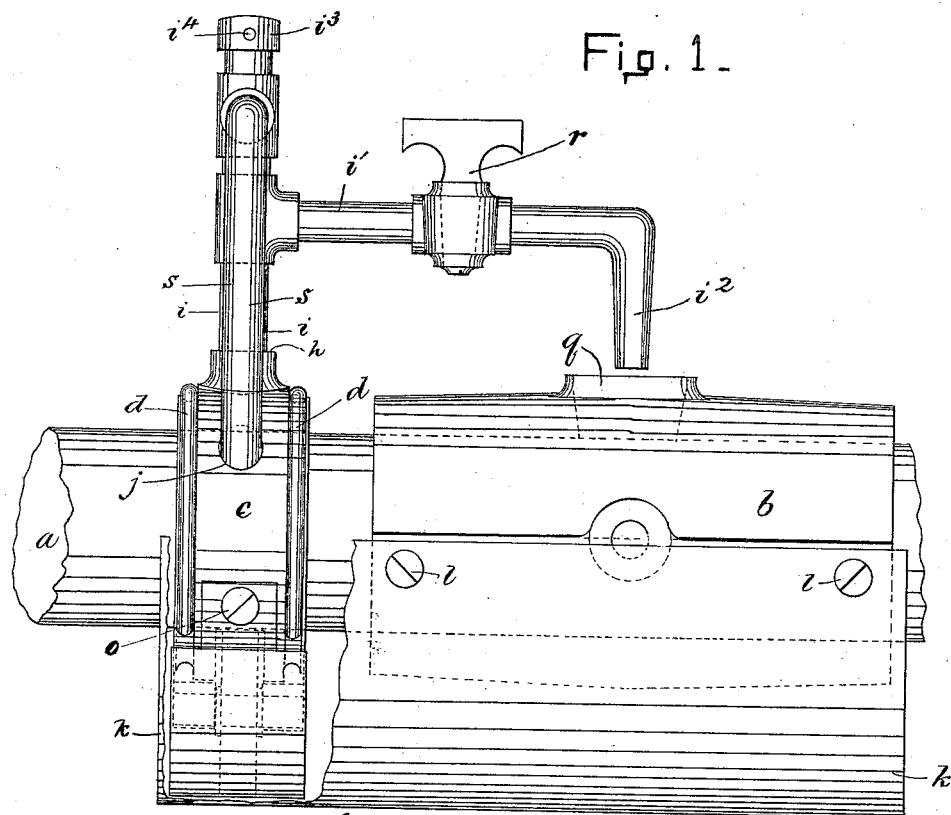
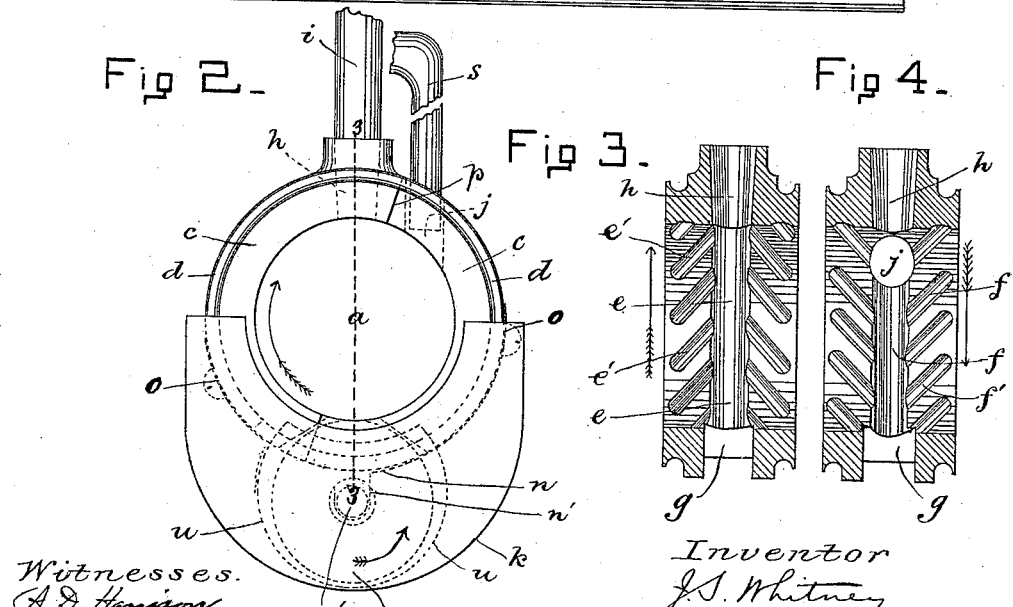
Witnesses.
A. D. Harrison.
O. G. Bartlett
Inventor
J. S. Whitney
by Wright Brown Quimby
Attys.

UNITED STATES PATENT OFFICE.

JOHN S. WHITNEY, OF NASHUA, NEW HAMPSHIRE.

LUBRICATING DEVICE.

SPECIFICATION forming part of Letters Patent No. 443,265, dated December 23, 1890.

Application filed June 27, 1890. Serial No. 356,985. (No model.)

*To all whom it may concern:*

Be it known that I, JOHN S. WHITNEY, of Nashua, in the county of Hillsborough and State of New Hampshire, have invented certain new and useful Improvements in Lubricating Devices, of which the following is a specification.

This invention has for its object to provide an automatic lubricator for shafting in which the rotation of the shaft in its bearings shall act to lift a supply of oil from a reservoir and permit said oil to flow into the bearing and return from thence to the reservoir.

The invention consists in the improved automatic lubricating device, which I will now proceed to describe and claim.

In the accompanying drawings, forming a part of this specification, Figure 1 represents a side elevation of a shaft hanger or bearing, a portion of the shaft therein, and the improved lubricating device arranged in its operative relation to the shaft and bearing. Fig. 2 represents an end elevation of the same. Figs. 3 and 4 represent sections of the grooved collar, which is applied to the shaft and constitutes a portion of my improved lubricating device, said sections being taken on the plane of line 3 3, Fig. 2, Fig. 3 showing the collar as viewed from the right of said line and Fig. 4 as viewed from the left.

The same letters of reference indicate the same parts in all the figures.

In the drawings, $a$ represents a shaft, and $b$ one of the boxes or hangers in which it is supported, said shaft and box being of the usual or any suitable construction. To the shaft is applied a collar $c$, which is located near one end of the box or hanger $b$ and is preferably composed of two sections of equal size, placed upon the shaft and held in contact therewith and with each other by means of springs $d\ d$, which are sprung into a groove formed in the periphery of the sections of the collar $c$, said springs constituting elastic hoops, as it were, which confine the sections of the collar. The object of this construction is to enable the collar to be easily applied to and removed from the shaft, and it is obvious that any other suitable means may be employed to detachably secure the sections of the collar to each other and to the shaft. The collar, formed as above described, is bored out internally to fit the periphery of the shaft, and in its internal surface are formed two grooves $e$ and $f$. The groove $e$ extends from an opening $g$ in the lower portion of the collar to the upper portion of the collar, and there communicates with a passage $h$, which extends through the upper portion of the collar and forms a part of a conduit, of which a vertical tube $i$, projecting upwardly from the collar, is an extension. The groove $f$ extends from an opening $j$ in the upper portion of the collar at one side of the opening $h$ along the inner surface of the collar opposite the surface containing the groove $e$ back to the opening $g$.

$k$ represents an oil reservoir or casing, which is attached by screws $l$ or otherwise to the box or hanger $b$, and projects from one end of said box sufficiently to inclose the lower portion of the collar $c$, as shown in Fig. 1, said reservoir being arranged to receive the oil that may drop from the ends of the box or hanger $b$.

$m$ represents a roller, which is provided with trunnions $m'$, which are journaled in bearings $n'$, formed on the ends of springs $n$, which are attached at $o$ to the periphery of the collar $c$. Said springs are arranged to support the roller $m$ and hold its periphery with a yielding pressure against the lower portion of the shaft $a$, the upper portion of the roller projecting into the opening $g$ in the collar. The lower portion of the roller $m$ is constantly in contact with the accumulation of oil in the reservoir $k$, and being in rolling contact with the shaft is caused to rotate by the latter, and thus carry on its periphery a supply of oil to the periphery of the shaft. The shaft and roller rotate in the directions indicated by the arrows marked thereon in Fig. 2. The oil thus carried to the lower portion of the shaft is caused to move upwardly through the groove $e$ by centrifugal force, and is carried up until it reaches the opening $h$, at which point its movement along the periphery of the shaft is arrested by a wall or partition $p$, which is a portion of the collar brought down into close contact with the periphery of the shaft, so that there is no opening or continuation of the oil-conducting groove between the openings $h$ and $j$. The oil rising through the groove $e$ is therefore caused to ascend through the opening $h$ and tube $i$ until it reaches a branch tube $i'$, which terminates in a downwardly-projecting nozzle $i^2$, arranged to deliver oil into an opening $q$ in the upper portion of the box or hanger $b$. The branch tube $i'$ is provided with a cock $r$, which permits the rapidity of the flow of oil to the box $b$ to be regulated.

$s$ represents a pipe, which is connected with the vertical pipe $i$ at a point above the branch $i'$ and extends downwardly therefrom into the opening $j$ in the collar $c$. Said pipe is adapted to return to the collar $c$ any surplus oil that may rise in the pipe $i$ above the branch $i'$, said surplus finding its way through the groove $f$ back to the opening $q$ in the lower portion of the collar and into the reservoir. It will be seen, therefore, that the rotation of the shaft causes the oil-supply wheel or roller $m$ to constantly supply oil to the shaft, and also causes the oil to flow upwardly through the groove $e$, tube $i$, and branch $i'$ to the bearing, the oil dropping from the nozzle $i^2$ into the bearing, so that the device constitutes a sight-feed, whereby an attendant is enabled to judge by inspection whether the bearing is receiving a sufficient quantity of oil or not. The surplus oil dropping from the bearing or box is collected by the reservoir and again raised to the shaft by the wheel $m$.

$u$ represents a strainer, which surrounds the wheel $m$, or that portion thereof which is immersed in the oil, and prevents sediment, &c., from coming in contact with the wheel. Said strainer may be of perforated sheet metal, wire-gauze, or any other suitable material.

To prevent the formation of a vacuum in the vertical tube $i$, I provide the same at its upper end with a cap $i^3$, having an air-hole $i^4$.

To facilitate the movement of the oil into the groove $e$, I form diagonal branch grooves $e'$ in the inner surface of the collar $c$, said grooves inclining upwardly and communicating with the main groove $e$, as shown in Fig. 3. Similar branch grooves $f'$, inclined downwardly, are formed in the opposite side of the collar and communicate with the groove $f$ to facilitate the return of the oil through said groove.

It will be seen that the oil is cooled in its passage through the reservoir to the box or bearing $b$.

I claim—

1. The combination, with a shaft and a hanger or bearing therefor having an oil-receiving opening in its upper portion, of a reservoir arranged to catch the oil that drops from said bearing, a wheel arranged in said reservoir in rolling contact with the shaft supported by said bearing, a collar surrounding said shaft and provided in one side with a groove to conduct oil upwardly and intersected at its lower portion by said wheel, a wall or partition brought down into close contact with the periphery of the shaft, and which forms the end wall of said groove, and a tube or conduit communicating with the upper portion of said groove and extended to a point over the oil-receiving opening of the bearing, said conduit being adapted to deliver to the bearing the oil raised through said groove by the rotation of the shaft, as set forth.

2. The combination, with a shaft, the collar thereon having internal grooves, a wall or partition separating said grooves, and a device intersecting said collar at its lower portion for conducting oil to the periphery of the shaft within said collar, of a tube or conduit communicating with the grooved interior of the collar, and having a branch pipe extending therefrom arranged to deliver oil to an oil-receiving opening in a bearing or shaft-support, as set forth.

3. The combination, with a shaft, of the internally-grooved collar, the wall or partition in said collar, an oil-delivering conduit communicating with said collar at the upper portion thereof, an oil-reservoir inclosing the lower portion of the collar, an oil-raising wheel in said reservoir intersecting said collar, and a spring attached to the collar and provided with bearings supporting said wheel in rolling contact with the periphery of the shaft, as set forth.

4. The combination, with a shaft, of the shaft-inclosing collar having internal oil-conducting grooves, the wall or partition separating said grooves, a conduit communicating with the upper portion of one of said grooves and adapted to conduct oil therefrom to a bearing of the shaft, the reservoir, the oil-raising wheel therein intersecting said collar and supported with its periphery in rolling contact with the periphery of the shaft, and a strainer in the reservoir surrounding said wheel, as set forth.

5. The combination, with a shaft, of the collar composed of separable sections, each being internally grooved to conduct oil, a wall or partition dividing the internal groove in said collar into two parts, a conduit communicating with one part of said groove and adapted to conduct oil therefrom to a bearing of the shaft, springs or spring-clamps applied to the external portions of said collar-sections and adapted to hold the same in position on a shaft, and a device for supplying oil to the shaft intersecting said collar at its lower portion, as set forth.

6. The combination, with a shaft, of the internally-grooved oil-conducting collar surrounding the shaft, the reservoir inclosing the lower portion of said collar, the oil-raising device in said reservoir intersecting the collar and supported in contact with the shaft, the wall or partition forming the end wall of the groove in said collar, the shaft-bearing arranged over said reservoir, a conduit extending from the upper portion of the collar and arranged to deliver oil to said shaft-bearing, and a cock in said conduit, whereby the supply of oil to the bearing may be regulated, as set forth.

7. The combination, with a shaft, of the collar $c$, formed to surround the shaft and having an opening in its lower portion, means for supplying oil at said opening, said collar having the internal grooves $e$ and $f$, the wall or partition separating said grooves, the groove $e$, extending upwardly from said opening to an oil-outlet $h$, and the groove $f$, extending downwardly from an oil-inlet $j$ to said opening, a conduit adapted to conduct oil from the outlet $h$ to a bearing of the shaft, means for regulating the flow of oil through said conduit, and means for conducting the surplus oil delivered from the outlet $h$ to the inlet $j$, as set forth.

8. The combination, with a shaft, of the internally-grooved oil-conducting collar, means for supplying oil to the lower portion of the shaft in said collar, the groove $e$ in one side of said collar, the wall or partition forming the end wall of said groove, the conduit $i$, communicating at the upper portion of said collar with said groove and having a branch arranged to deliver oil to a bearing surrounding the shaft, the return-tube $s$, extending from a point in said conduit above said branch to the collar, and the groove $f$, communicating with said tube $s$ and arranged to conduct surplus oil downwardly to the opening in the lower portion of the collar, as set forth.

9. The combination, with a shaft, of the oil-conducting collar having in its upper portion an outlet-opening $h$, an inlet-opening $j$, and a wall $p$ between said openings, a conduit adapted to conduct oil from the outlet $h$ to a bearing on the shaft, means for conducting the surplus oil delivered at said outlet $h$ to the inlet $j$, said collar having in its lower portion an oil-receiving opening $g$, and having on its inner periphery the grooves $e$ and $f$, communicating, respectively, with the outlet $h$ and with the inlet $j$, and means for supplying oil to the shaft at the oil-receiving opening $g$, as set forth.

In testimony whereof I have signed my name to this specification, in the presence of two subscribing witnesses, this 6th day of May, A. D. 1890.

JOHN S. WHITNEY.

Witnesses:
C. J. HAMBALL,
R. P. ELLIOTT.